M. F. HOLDERMAN.
TRACKER BOARD FOR PIANO PLAYERS.
APPLICATION FILED MAY 24, 1909.
957,774.
Patented May 10, 1910.
8 SHEETS—SHEET 1.
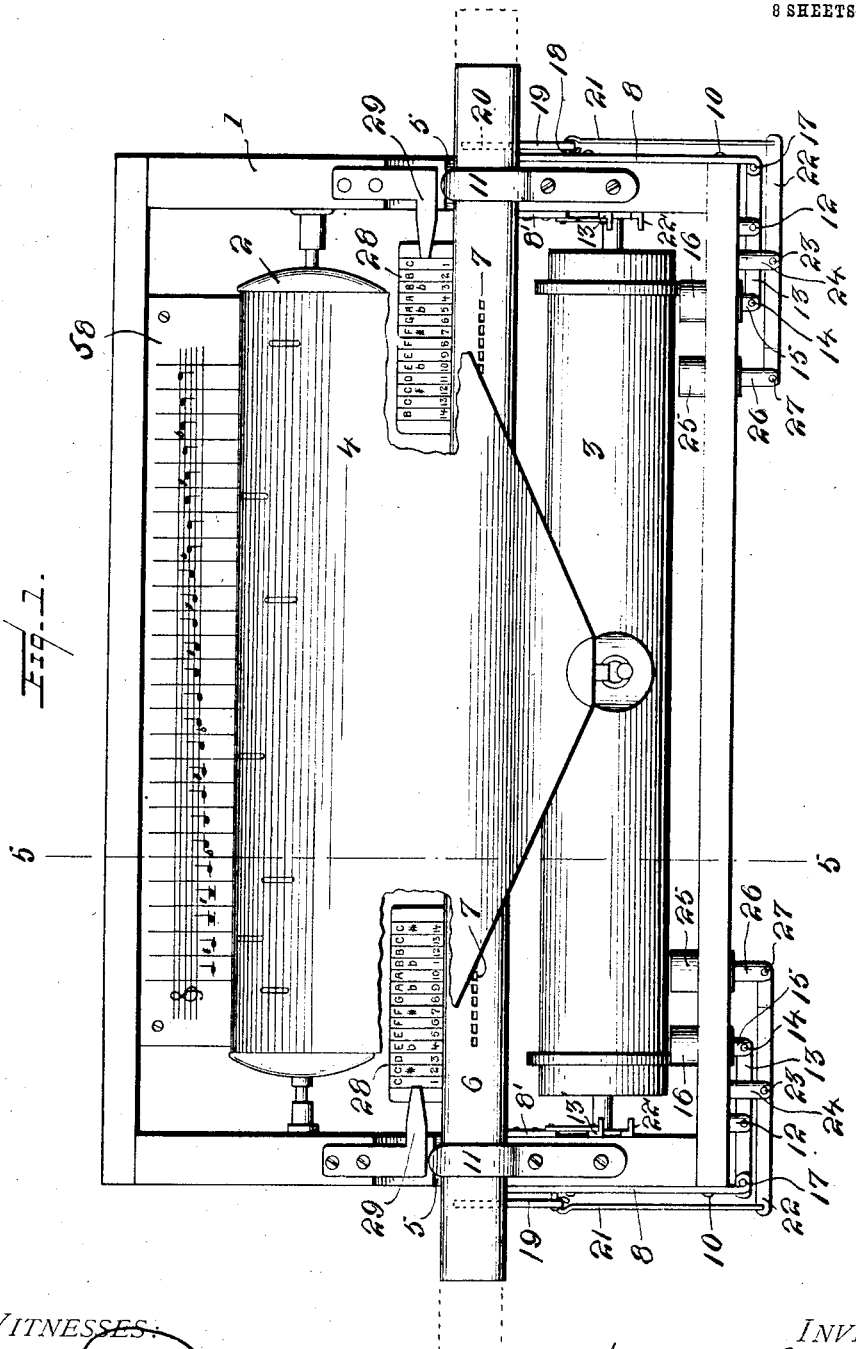
WITNESSES:
Wm F Koy
a. L. Hough
INVENTOR
Marion F. Holderman
BY
Franklin N. Hoyt
Attorney

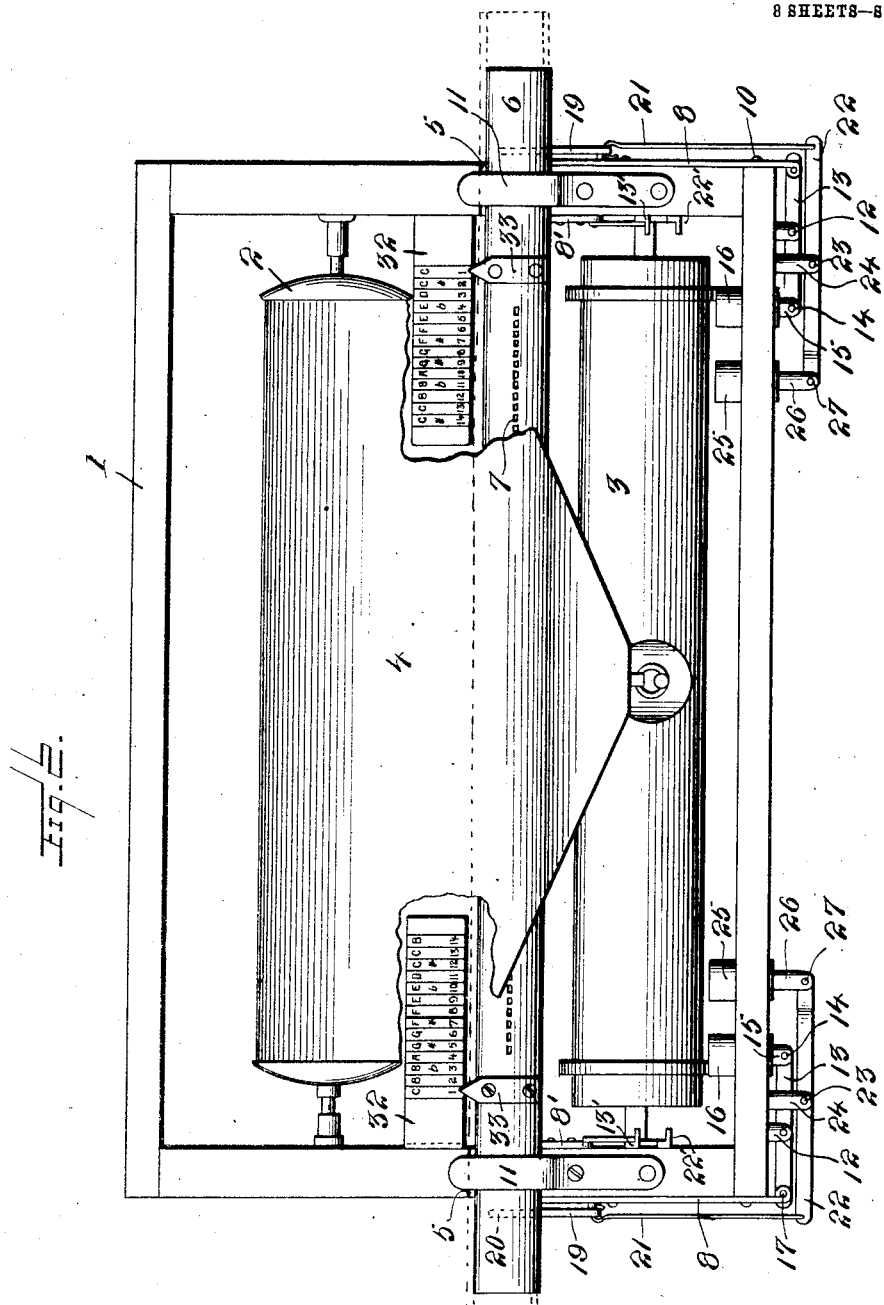

M. F. HOLDERMAN.
TRACKER BOARD FOR PIANO PLAYERS.
APPLICATION FILED MAY 24, 1909.
957,774.
Patented May 10, 1910.
8 SHEETS—SHEET 3.
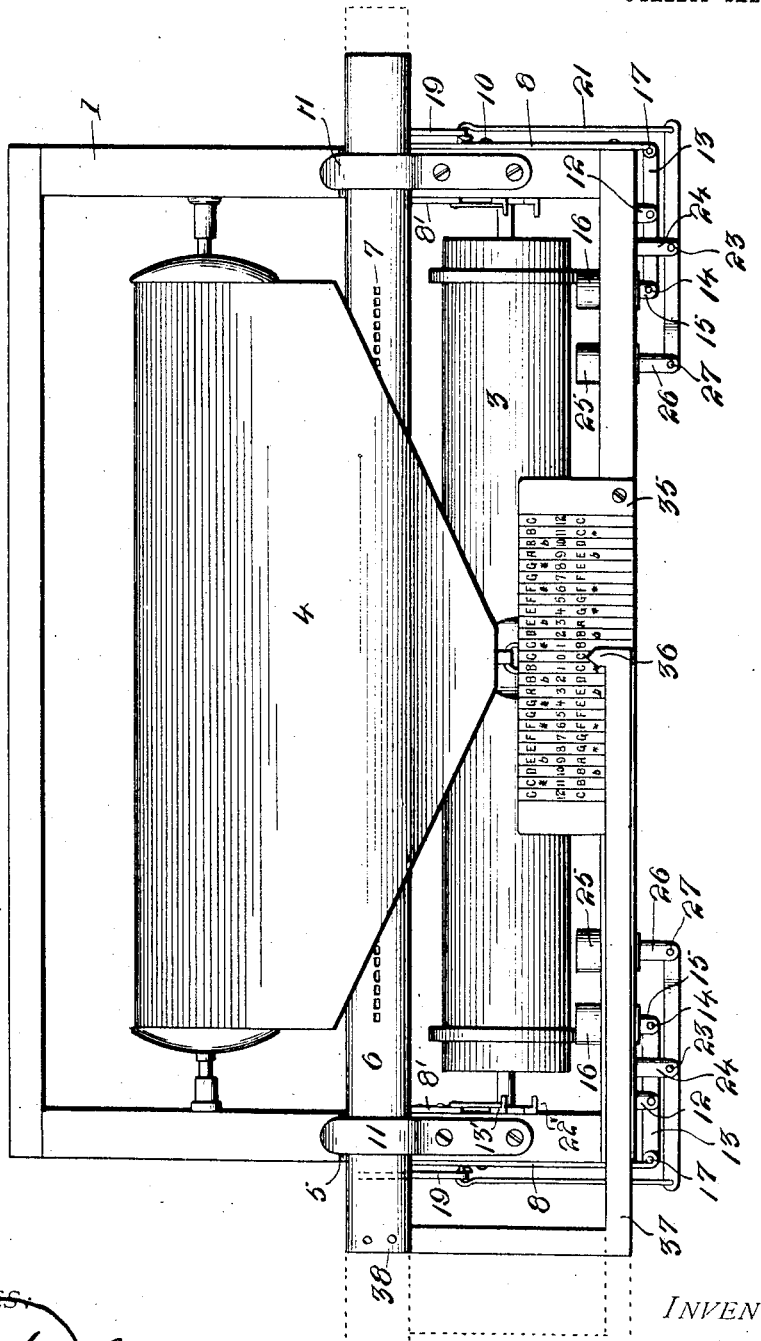

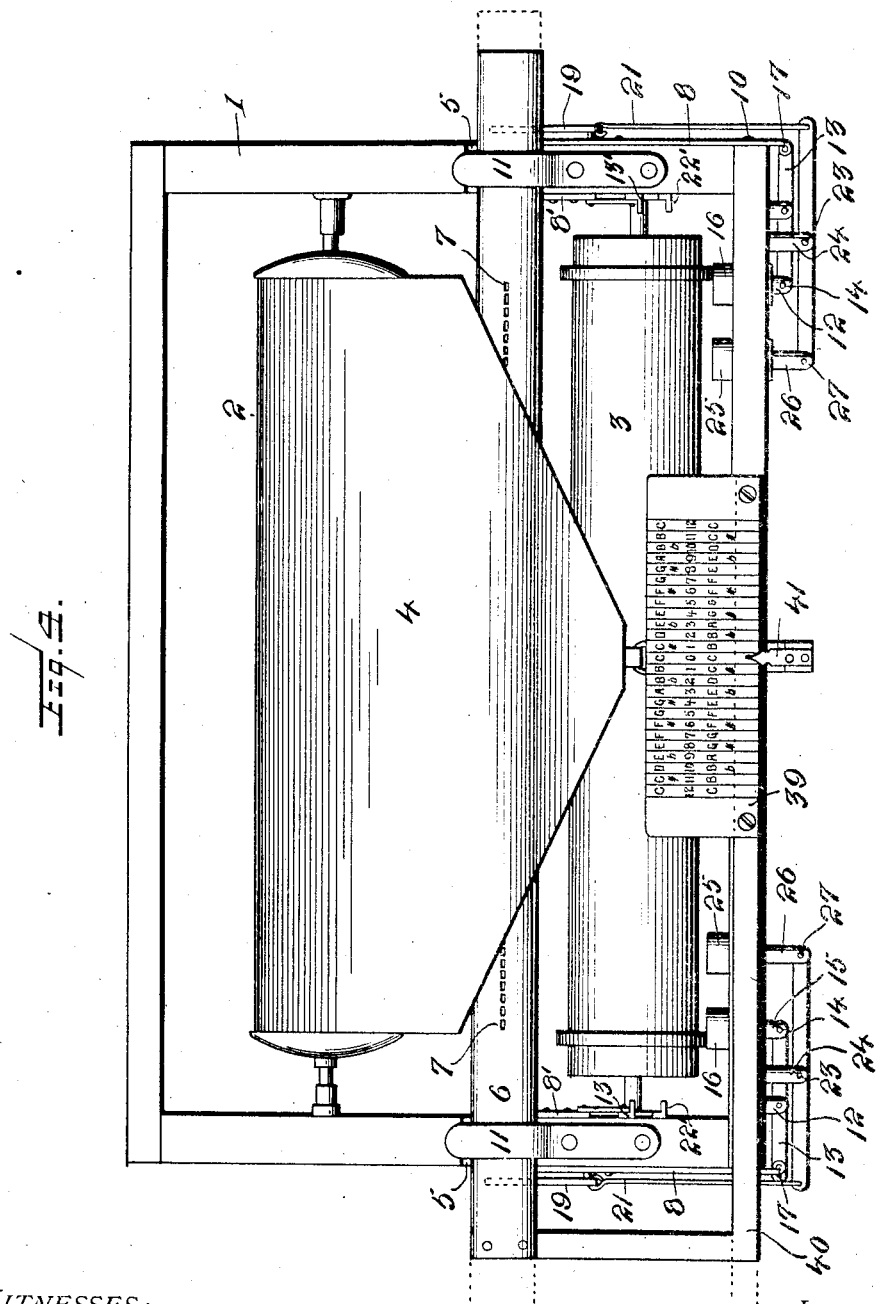

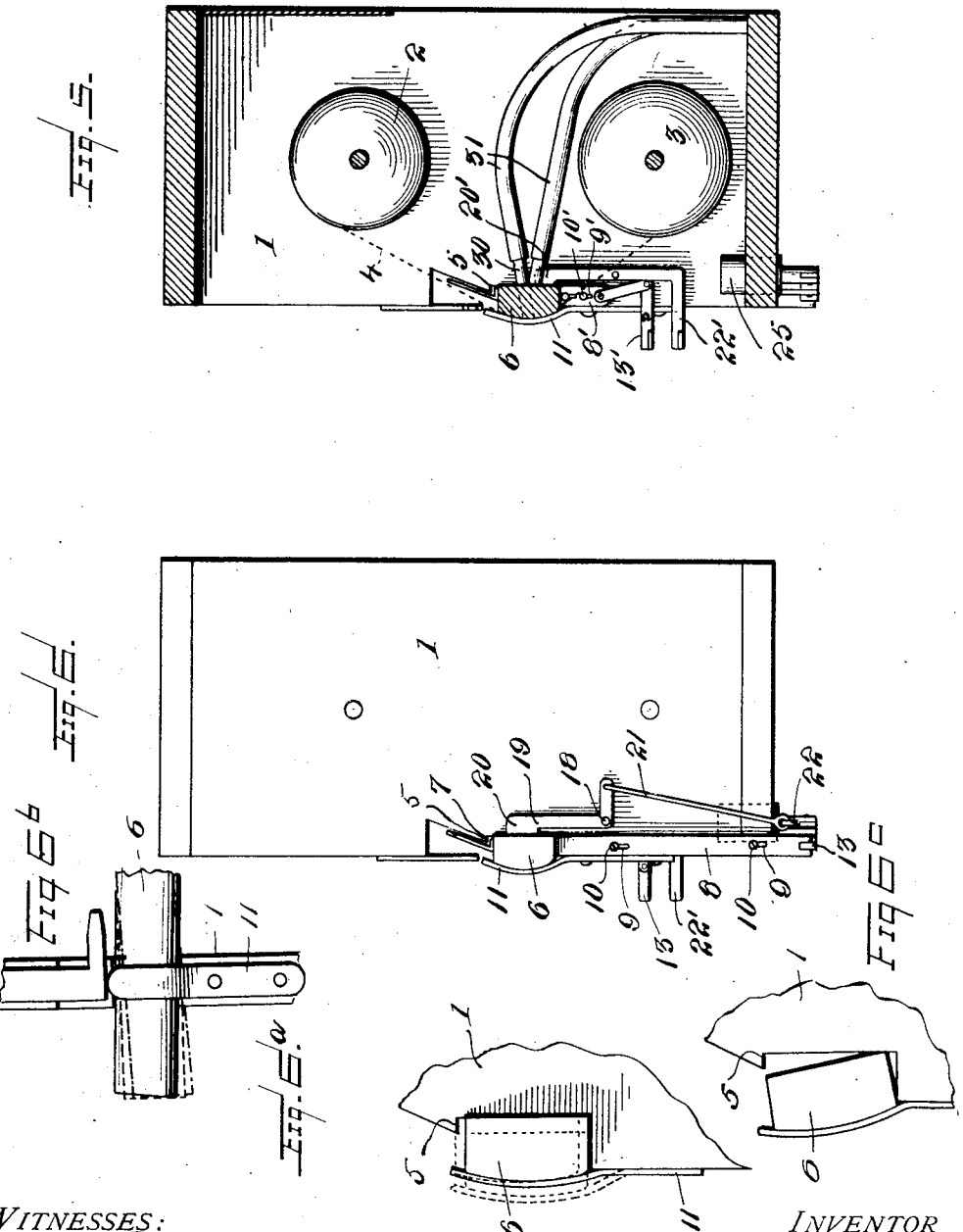

M. F. HOLDERMAN.
TRACKER BOARD FOR PIANO PLAYERS.
APPLICATION FILED MAY 24, 1909.
957,774.
Patented May 10, 1910.
8 SHEETS—SHEET 6.
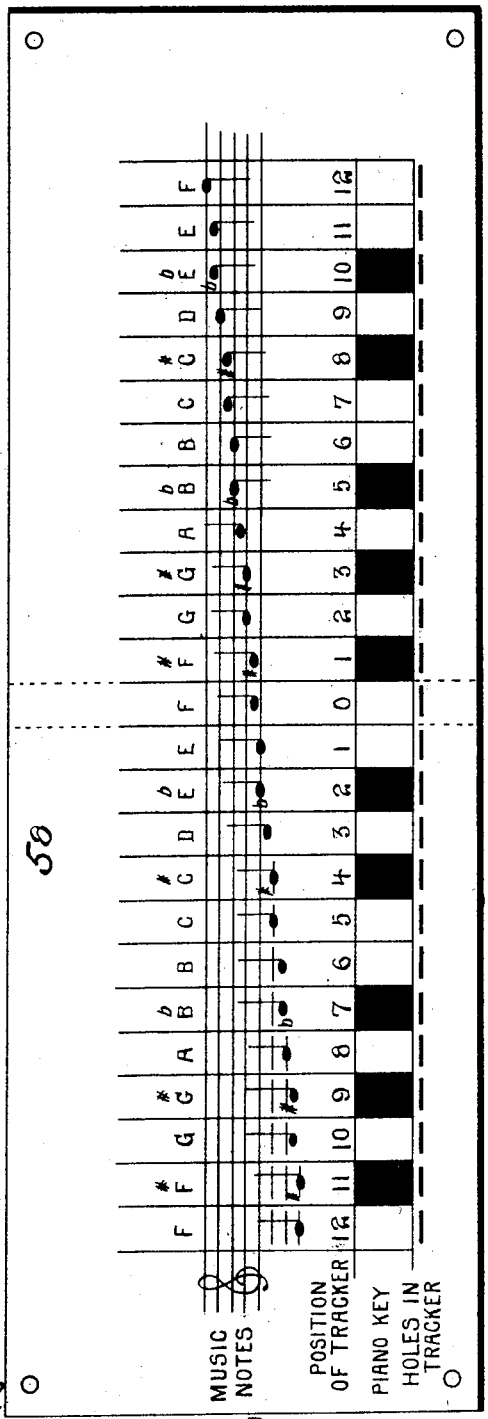

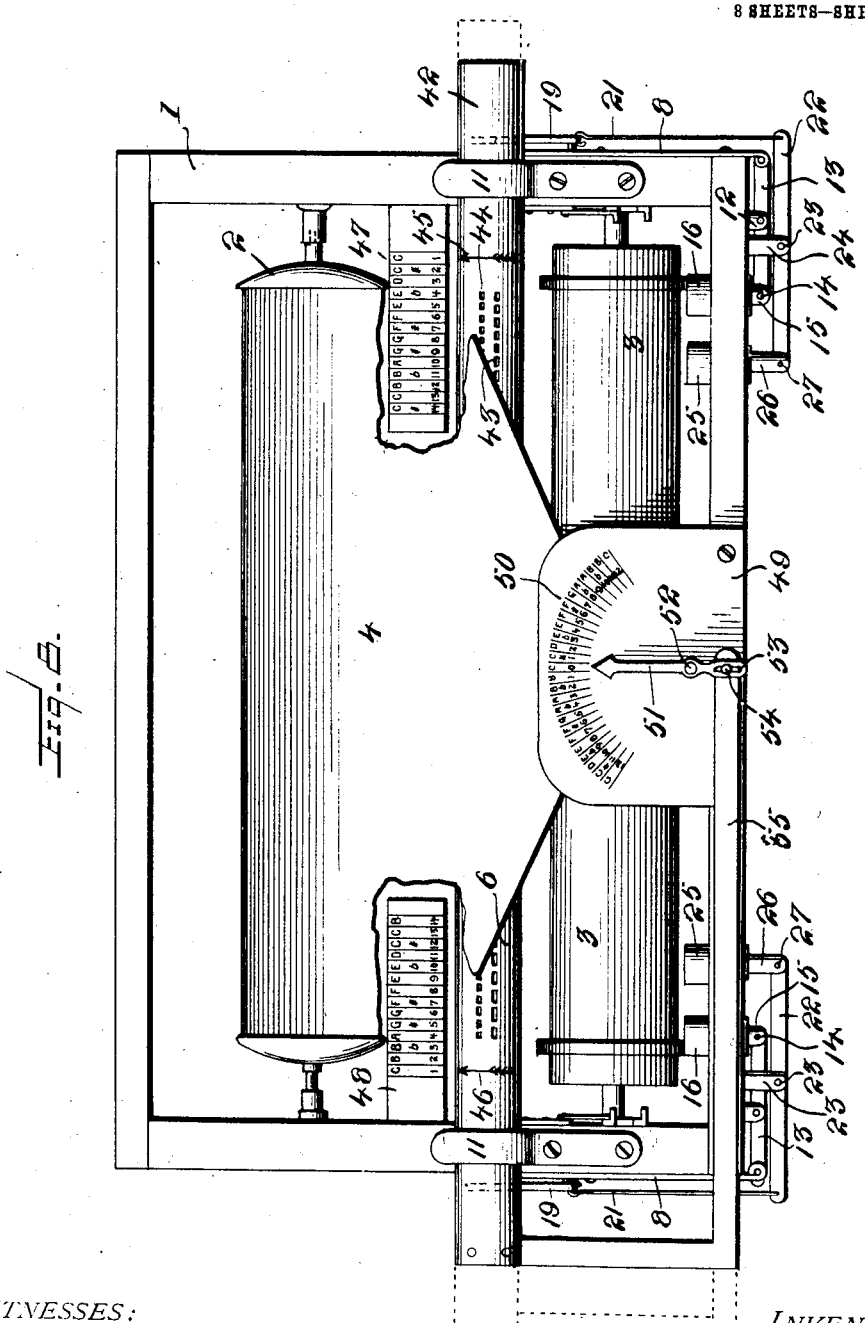

M. F. HOLDERMAN.
TRACKER BOARD FOR PIANO PLAYERS.
APPLICATION FILED MAY 24, 1909.
957,774.
Patented May 10, 1910.
8 SHEETS—SHEET 8.
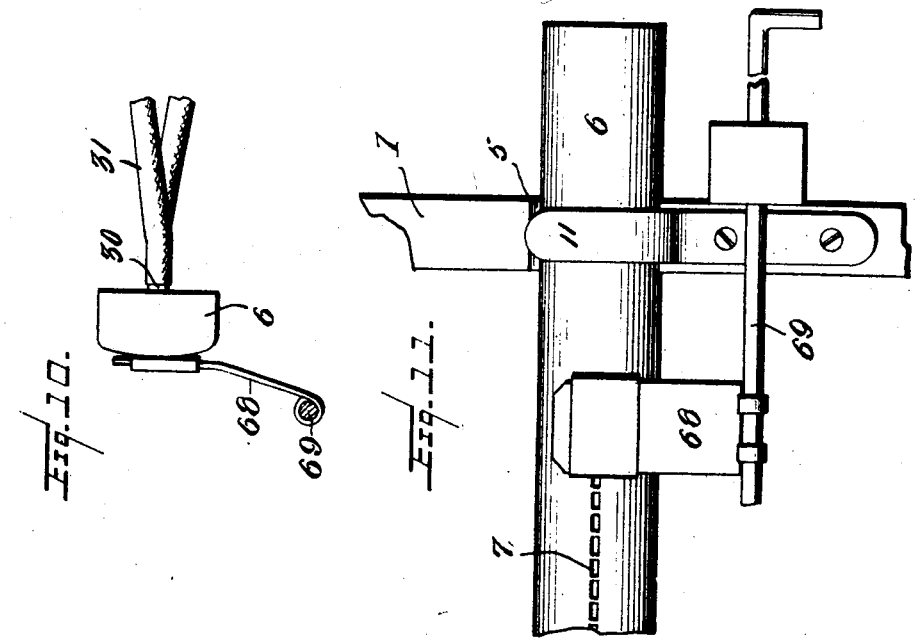
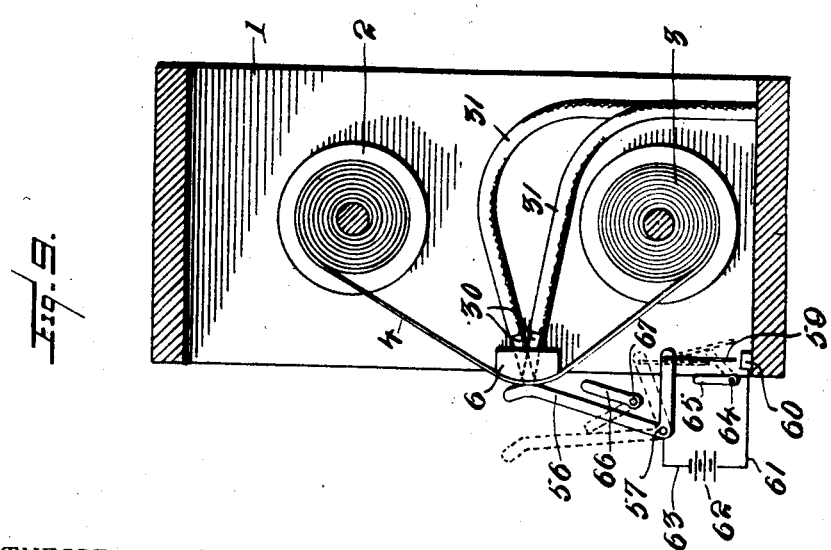
WITNESSES:
INVENTOR
Marion F. Holderman
BY Franklin H. Hough
Attorney

UNITED STATES PATENT OFFICE.

MARION F. HOLDERMAN, OF WASHINGTON, DISTRICT OF COLUMBIA.

TRACKER-BOARD FOR PIANO-PLAYERS.

957,774.

Specification of Letters Patent. Patented May 10, 1910.

Application filed May 24, 1909. Serial No. 497,989.

*To all whom it may concern:*

Be it known that I, MARION F. HOLDERMAN, a citizen of the United States, residing at Washington, in the District of Columbia, have invented certain new and useful Improvements in Tracker-Boards for Piano-Players; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in movable trackerboards for mechanical musical instruments, such as piano players and other instruments, and comprises essentially a trackerboard capable of a universal movement and affording means whereby pieces of music may be played in any key, the adjustment of the trackerboard being determined by a suitable indicator card and pointer.

The invention relates more specifically to structures or devices operated or controlled by perforated sheets or rolls or other selectors, such as automatic musical instruments, machines for perforating strips or otherwise making the sheets or rolls which are used in such instruments for reproducing music or accomplishing various purposes.

The invention comprises further a trackerboard which may be moved at any angle to the line of travel of the perforated strip and toward or away from the latter and in means for holding the trackerboard in any of its adjusted positions, affording means whereby pieces of music may be played or perforated strips formed, the latter guided as it is wound truly from one reel to another with as little friction as possible.

The present invention comprises various other details of construction, combinations and arrangements of parts which will be hereinafter fully described and then specifically defined in the appended claims.

I illustrate my invention in the accompanying drawings, in which:—

Figure 1 is a front elevation of a well showing the application of my invention thereto, in which indicating cards are shown as mounted upon the tracker board and movable therewith with stationary indicating pointers upon the frame of the well. Fig. 2 is a similar view showing stationary indicating cards mounted over the tracker board and adapted to register with the indicating pointers on the trackerboard. Fig. 3 is a similar view in elevation showing an indicating card fixed to the well and illustrating an indicating pointer movable with the trackerboard. Fig. 4 is a front elevation of a well showing a still different modified form of my invention in which the indicating card is mounted upon an arm fastened to the trackerboard and a stationary indicator pointer fastened to the well frame. Fig. 5 is a cross sectional view on line 5—5 of Fig. 1. Fig. 6 is an end view of the construction shown in Fig. 1 of the drawings. Fig. 6$^a$ is a detail view showing in dotted lines different positions the trackerboard may assume. Fig. 6$^b$ is a detail view showing the tilting adjustments of the trackerboard. Fig. 6$^c$ is a detail view showing the forward adjusting movement of the trackerboard. Fig. 7 is an enlarged plan view of the indicating card. Fig. 8 is a view in elevation showing a slight modification of the invention in which two rows of apertures are shown and the provision of a distinct indicating card and pointer for e 1 series of apertures, and in Fig. 9 I have shown a modification of my invention in which selectors are provided which are adapted to close circuit as the selector moves through a perforation of the strip. Figs. 10 and 11 are detail views of a curtain.

Reference now being had to the details of the drawings by numerals, 1 designates a well of the apparatus, which is of the general shape and construction of those commonly employed in a piano player, and mounted in said well are the two spools 2 and 3 upon which the perforated strip 4 is adapted to wind. The upright end pieces of said well are recessed at 5 at positions opposite each other and adapted to receive a movable trackerboard 6 which is of the standard make and provided with a series of uniform sized apertures 7. The recesses formed in the edges of the upright pieces of the well are preferably slightly wider than the width of the trackerboard in order to allow the latter to have a slight tilting movement, if necessary for any purpose, and the ends of the trackerboard preferably project beyond the opposite ends of the well.

In order to raise one end or the other of the trackerboard slightly, I provide the longitudinally movable bars 8, one being mounted upon the outer face of each end strip of the well, as shown clearly in the drawings, and said bars 8 are provided with elongated slots 9 through which the headed pins or screws 10 project which are fastened to the ends of the well. The upper end of each of said bars 8 is adapted to contact with the under edge of the trackerboard and, when an upper longitudinal movement is imparted to either of said bars, it causes one end or the other of the trackerboard to move upward slightly. In order to hold the trackerboard within said recesses, I provide springs 11 which are fastened to the ends of the well and bear yieldingly against the outer convexed face of the trackerboard with sufficient friction to hold the latter in an adjusted position and yet allow it to be instantly and freely moved in any direction. Pivotally mounted upon a projection 12 upon the under edge of the well is a lever 13, one end of which is pivoted at 14 to the lower end of the shank 15 of the key 16, while the other end of said lever 13 is pivotally connected at 17 to the lower end of the longitudinally movable bar 8. It will be noted upon reference to the drawings that one of said levers 13 is provided at each end of the well and each adapted to actuate one of said bars 8 for the purpose set forth.

Pivotally mounted upon a pin 18 on the outer edge of the ends of the well, as shown clearly in Fig. 6 of the drawings, is an angle lever 19, the upper laterally projecting end 20 of which is adapted to bear against the rear face of the trackerboard, while the lower end thereof is fastened to a rod 21 which in turn is pivotally connected to one end of a lever 22 which is pivotally mounted upon a pin 23 upon the projection 24 of the well, and 25 designates a key, the shank portion 26 of which is pivoted at 27 to the lever 22. It will be noted that there are two angled levers 19 of similar construction mounted one at each end of the well and each provided with means for tilting the same of similar construction as above described, said angled levers being adapted to move one end or the other of the trackerboard.

In Fig. 1 of the drawings, I have shown my improved indicating cards, designated each by numerals 28, as fixed to the trackerboard and stationary angled pointers 29 are fastened one to each end of the well and adapted to register over the face of the indicating card as the latter is moved in one direction or the other with the trackerboard. When rubber or other elastic flexible air tubes 31 are utilized to communicate between the apertures or passages in the trackerboard and the usual or any approved pneumatic devices influencing the sound producing apparatus, said tubes are preferably fitted to nipples 30 which are fixed in the apertures of the trackerboard and also connected to the pneumatic board. Said nipples, which are made either of metal, glass or other material, are preferably inserted into the flexible tubes and the nipples forced into the holes in the trackerboard, thus dispensing with the usual gluing or cementing of the parts and, when the tubes are thus connected without gluing, they may be easily removed and replaced for repairs or cleaning without injury to any of the parts.

In Fig. 2 of the drawings, I have shown a slight modification of my invention in which the graduated indicating cards 32 are stationary, being fixed preferably to the ends of the well, and fixed pointers 33 are fastened to the trackerboard and adapted to move over the graduated faces of the cards.

In Fig. 3 of the drawings, I have shown another modification of the invention, in which the indicating card, designated by numeral 35, is fastened to the lower edge of the well, preferably in the center thereof and in front of the lower portion of the lower spool or roller and an indicating pointer, designated by numeral 36 and mounted upon an indicating arm 37, is fastened at one end 38 to one end of the trackerboard outside the well.

In Fig. 4 of the drawings, I have shown still another modification of the arrangement of the indicating card in which the indicating card, which is designated by numeral 39, is fastened to a movable angled bar 40 which is fastened to the trackerboard in the same manner as shown in Fig. 3 of the drawings and an indicating pointer, designated by numeral 41, is fixed centrally to the lower edge of the well.

In Fig. 7, I have shown a large indicating card, designated by numeral 58, which is adapted to be fastened in the center of the well above the trackerboard and is provided for indicating the musical notes, the position of the tracker, the piano keys and the holes in the tracker so that any person may readily ascertain the relative position of the tracker or perforated music sheet.

In Fig. 8 of the drawings, I have shown a slight modification of my invention in which means is afforded for adapting the trackerboard for playing various forms of music in which it is necessary to provide more than one row of apertures in the trackerboard, the perforations in one row being substantially one half of the length of those in the other and each row requiring a distinct indicator mechanism in order to readily indicate the key in which it is desired to play the music and in said Fig. 8 the trackerboard 42 has the two series of apertures 43 and 44, the former of which, forming the lower series, are substantially twice the length of the perforations or apertures 44. Mounted upon the trackerboard 42 are the indicating pointers 45 and 46, one indicating over the indicating card 47 and the other over the indicating card 48, both fastened to the well, while a third indicating-card, designated by numeral 49, is fixed to the lower edge of the well and has a graduated scale 50 formed on the arc of a circle. An indicating pointer 51 is pivotally mounted upon a pin 52 upon the card 49 and moves over the scale 50, while its other end is provided with a slot 53 through which a pin 54 carried by the angled arm 55 is adapted to have a sliding pivotal connection. The bar 55 is fastened to one end of the trackerboard in the manner shown in Fig. 3 of the drawings. In the modified form in Fig. 8, the various parts of the apparatus, consisting of the spring for frictionally engaging and holding the trackerboard in different positions and the key mechanism for actuating the same, are of the construction shown in the other views, hence further detailed description of the same is not deemed necessary. The indicator cards above the trackerboard are used for the upper row of apertures and the indicating card which is fastened below the trackerboard and adjacent to which the pivotal pointer moves is used in connection with the lower row of apertures in the trackerboard. Another form of mechanism for moving the trackerboard up or down, tilting the same or moving the same forward is shown in the drawings in which 8' designates two vertically movable sliding bars, each having a slot 9' through which pins 10' pass, as shown clearly in Fig. 5 of the drawings, and 13' designates a pivotal lever connected by link to the bar 8' forming means for moving the bar 8' upward. 20' designates the upper angled end of a pivotal lever 22' which latter is utilized for moving the trackerboard forward as the lever is tilted.

In Fig. 9, I have shown a still different modification of my invention in which the apparatus is adapted for operating selectors, close electrical circuits, etc., and in which a series of metallic conductor levers 56 are mounted upon a pin 57 and a portion of each lever is adapted to contact with the perforated strip of paper 4 and, when a perforation comes opposite the contact point between the lever and the paper, it is adapted to fall through said perforation and cause the lever to tilt slightly a sufficient distance to allow a metallic pendent finger 59 pivoted thereto to contact with an electrode 60 which in turn is connected through the medium of the contact wire 61 with the battery 62 and in turn through the wire 63 with the lever 56, thus completing a circuit for the purpose of actuating any form of mechanism. Mounted upon a pin 64 are the levers 65, each of which is adapted, as it is moved by any suitable mechanism not shown, to cause one or another of the fingers 59 to be thrown to the position shown in dotted lines in Fig. 9 so that, when the lever is actuated through the medium of the perforated strip, it will not contact with the electrode 60. A second series of levers, each designated by numeral 66 mounted upon a pin 67, may move one or another of the levers 56 away from the perforated sheet in order that the lever will not actuate mechanism for closing the circuit. By this modification, both the pneumatic or the electrical mechanism may be operated at the same time or independent of the other, the electrical means being specially useful in connection with the pneumatic instrument for playing octaves, etc., or the pneumatic action being useful for operating reeds, while the electrical means may be used where greater or less power is required for the mechanical operation, but which details are not embodied in the present application but will form subject matter for subsequent applications.

In Figs. 10 and 11, I have shown detail views illustrating the application of a curtain 68 which is pivotally mounted upon a rod 69 carried by the well, said curtain being adapted to swing against the perforated sheet and close certain apertures of the trackerboard.

In operation, it will be understood that, as the ducts or tubes of the trackerboard or range communicate with pneumatic devices for given notes or tones of the instrument, the shifting of the trackerboard across the line of travel of the music sheet will change the key of the music which will be produced by the travel of the music sheet, a movement to the left having the effect to expose to the action of the perforated music sheet a range of notes higher up and raise the key, while a movement to the right for like reason will lower the key in which the music will be played. The tubes being flexible and the trackerboard not being fixed enables the operator to accurately and instantly adjust and move the trackerboard to lower or raise the key one or any number of semitones or to give by a skew or tilt the air or solo to be played due prominence.

In the art to which this invention relates, it is well known that the pneumatic piano players as usually constructed are adapted to play the music in the key in which the "music" is made only and further that oftentimes the music is not perforated or made in the best key or to the one most pleasing to the operator. By the provision of my improved apparatus, the movable trackerboard will enable the operator to play the music in any number of keys from the one sheet, no matter in what way it may be made, and the change from one key to another can be instantly effected while the music is running over the trackerboard, the trackerboard being adapted to move in any direction or any desirable distance.

By the provision of an indicating card having the arrangement of letters and figures as shown, the operator may move the indicating pointer or the indicating card relative one to the other in order to automatically adjust the key in which it is desired to play the piece.

The indicator cards are graduated to correspond to the size of the apertures or holes in the trackerboard and they register the movement of the trackerboard to the right or left. The figures upon the indicator cards, it will be understood, show how many semi-tones the trackerboard is to be moved to the right or left for the key desired and the letters show the key. The letters in conjunction with the figures enable any transposition desired, while the pointers show how far the trackerboard has been moved and the key.

It will be understood that, in the illustration in the drawings, the pointers are normally positioned to indicate a sheet of music in the key of C but, when a perforated sheet is applied to the spools written in any other key, the pointer is positioned opposite the line adjacent to the particular subdivision on the card in which the particular key of music appears and then, when it is desired to play the piece in a still different key, the pointer may be moved in one direction or the other as may be desired.

As it frequently happens that musical records from various reasons become affected by exposure to atmospheric influences, one edge or the other of the sheet will shrink or expand, thus making it impossible to operate an instrument with such defective record strip but, by the provision of a universally movable trackerboard, which universal movement contemplates the movement of the trackerboard to the right or left, up or down, or tilting one end or the other, or moving the same forward, the trackerboard may be quickly and conveniently adjusted to conform to any irregularities in the record strip, such as uneven edges, some of which may be shrunken and others expanded, etc. From these and other causes, the perforated record strip will travel over the trackerboard with the perforations not accurately registering with the mouths of the perforations in said trackerboard. The inaccuracy may be corrected by moving the trackerboard up or down by the manipulation of one or the other of the keys 16 of the trackerboard. The trackerboard may be moved longitudinally in either direction by the operator simply taking hold of the trackerboard and moving the same to the right or left as may be desired, thus causing the perforations in the music sheet to register with the mouths of the openings in the trackerboard. As the pitch of the various suction holes of the trackerboard is uniform and corresponds to a semitone, it will be apparent that by moving the trackerboard longitudinally a distance equal to that between two adjacent holes, it will have the effect of lowering or raising the key note of the musical composition a semitone and that the moving of the trackerboard twice this distance will produce a double effect and so on. For instance, let us suppose the accompaniment to a song is desired to be transposed into a key note that differs from the original by two semitones or by a whole note, the trackerboard is moved two holes and the music may be played in the desired key. There are thirteen sounds in the chromatic scale of an octave and the trackerboard may be moved in either direction any distance to suit any prepared music roll for effecting the player or the music. By the provision of a universally movable trackerboard embodying the features of the present invention, perforated music sheets of various widths may be utilized and having any number of notes or rows of perforations, the adjustment of the means to the particular sheet of music being readily determined by the card and indicating pointer. By the provision of the means for moving the trackerboard in different directions, objectionable noises incident to the passing of the music strip over the trackerboard, which is common to the usual piano players, may be dispensed with by lessening the friction intermediate the trackerboard and the perforated strip and the latter may also be guided truly by raising or lowering one end of the trackerboard as the strip is wound from one spool to another.

It will be apparent that apparatus embodying the features of the present invention may be adapted to various forms of perforating machines, automatically operating selecting mechanism for organs, zithers, guitars, violins, various wind and scientific instruments, etc., and, owing to the wide range of adjustment of the trackerboard, may be operated so as to facilitate quick, sharp repetition of notes, or tones, while slots or perforations of the music sheet or strip having the preferred rounded or convexed ends or other outlined apertures and which will promote easy travel of the music sheet around its delivery and take-up rolls and enhance the durability of the sheet. The quick note repetition may be obtained by moving the air passages of the tracker so that they are always fully coöperating with the rounded ends of the music sheet, slots, or perforations and particularly allowing a full amount of air in the passageways and thus lengthening the bridges between closely following perforations of the music sheet.

It will be understood that the movable portions of the trackerboard may be formed of any suitable material, such as wood, rubber, metal, glass, cement, lead, zinc, copper, paper, cloth, celluloid or aluminum, either separate or in combination, but, preferably any material which will hold its form and which will not present a frictional surface to the moving music strip or sheet. I have found in my experiments that glass makes a very suitable trackerboard as it does not corrode or rust or change with the weather. If preferred, I may make the parts of material having the same coefficient of expansion and contraction under atmospheric conditions as the music strip to be used with it.

What I claim to be new is:—

1. In combination with the well of a piano player, a universally movable trackerboard mounted in said well, and means for raising either end of the trackerboard relative to the line of travel of a perforated music sheet.

2. In combination with the well of a piano player, a universally movable trackerboard mounted in said well, means for moving either end of the trackerboard at different angles to the line of travel of the music sheet, and means for moving the trackerboard forward.

3. In combination with the well of a piano player, a universally movable trackerboard mounted in said well, and movable bars adapted to bear against the under edge of the trackerboard to move one end or the other of the latter at different angles to the line of travel of a perforated music sheet.

4. In combination with the well of a piano player, a universally movable trackerboard mounted in said well, movable bars adapted to bear against the under edge of the trackerboard to move one end or the other of the latter at different angles to the line of travel of a perforated music sheet and lever mechanism adapted to move said bars longitudinally.

5. In combination with the well of a piano player, a universally movable trackerboard mounted in said well, movable bars adapted to bear against the under edge of the trackerboard to move one end or the other of the latter at different angles to the line of travel of a perforated music sheet, pivotal levers mounted upon the well and adapted to move said bars longitudinally, and a key pivoted to each of said levers.

6. In combination with the well of a piano player, a universally movable trackerboard mounted in said well, means for moving either end of the trackerboard at different angles to the line of travel of the music sheet, and mechanism coöperating with said means and the said well for holding the trackerboard in an adjusted position.

7. In combination with the well of a piano player having openings in the opposite sides thereof, a universally movable trackerboard mounted in said openings, and means for moving either end of the trackerboard within said openings relative to the line of travel of a perforated music sheet.

8. In combination with the well of a piano player having openings in the opposite sides thereof, a universally movable trackerboard mounted in said openings, springs fastened to the edges of the well and extending across said openings, angle levers pivoted upon the frame and bearing against the rear faces of the trackerboard and adapted to move the latter against a perforated music sheet.

9. In combination with the well of a piano player having openings in the opposite sides thereof, a universally movable trackerboard mounted in said openings, springs fastened to the edges of the well and extending across said openings, angle levers pivoted upon the frame and bearing against the rear faces of the trackerboard, key actuated levers, and link connections with said angle levers.

10. In combination with the well of a piano player, a universally movable trackerboard mounted in said well, means for raising either end of the trackerboard relative to the line of travel of a perforated music sheet, and flexible pipes connected to the trackerboard adapted to communicate with pneumatics.

11. In combination with the well of a piano player, the opposite edges of said well having open recesses a trackerboard having a universal movement in said recesses, means for raising either end of said trackerboard within said recesses relative to the line of travel of a perforated sheet, and means for confining the trackerboard within said recesses.

12. In combination with the well of a piano player, the opposite edges of said well having open recesses a trackerboard having a universal movement in said recesses, means for moving said trackerboard within said recesses at different angles to the line of travel of a perforated sheet, springs fastened to the recessed edges of the well and having their free ends extending over the openings in the recesses.

In testimony whereof I hereunto affix my signature in the presence of two witnesses.

MARION F. HOLDERMAN.

Witnesses:
E. R. LEVY,
A. L. HOUGH.